(12) United States Patent
Chou et al.

(10) Patent No.: US 10,895,741 B2
(45) Date of Patent: Jan. 19, 2021

(54) ULTRA-WIDE HEAD-UP DISPLAY SYSTEM AND DISPLAY METHOD THEREOF

(71) Applicant: Industrial Technology Research Institute, Hsinchu (TW)

(72) Inventors: Ming-Chieh Chou, Kaohsiung (TW); Yi-Cheng Chen, New Taipei (TW); Yao-Hui Lee, Tainan (TW); Kuo-Chih Wang, Tainan (TW); Yu-Chieh Hsiao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 46 days.

(21) Appl. No.: 16/027,379

(22) Filed: Jul. 5, 2018

(65) Prior Publication Data

US 2019/0101751 A1    Apr. 4, 2019

(30) Foreign Application Priority Data

Oct. 3, 2017  (TW) .............................. 106134276 A
May 11, 2018 (TW) .............................. 107116081 A

(51) Int. Cl.
*G02B 27/01* (2006.01)
*G09G 3/02* (2006.01)
(Continued)

(52) U.S. Cl.
CPC ..... *G02B 27/0101* (2013.01); *G02B 27/0179* (2013.01); *G06T 19/006* (2013.01); *G09G 3/002* (2013.01); *G09G 3/02* (2013.01); *G09G 5/14* (2013.01); *G09G 5/373* (2013.01); *G02B 2027/014* (2013.01);
(Continued)

(58) Field of Classification Search
None
See application file for complete search history.

(56) References Cited

U.S. PATENT DOCUMENTS 6,714,331 B2   3/2004  Lewis et al.
7,508,356 B2   3/2009  Kanamori et al.
(Continued)

FOREIGN PATENT DOCUMENTS

CN    1922055    2/2007
CN    101464562  6/2009
(Continued)

OTHER PUBLICATIONS

Fan Chao et al., "Development of a Micromirror Based LaserVector Scanning Automotive HUD", Proceedings of the 2011 IEEE International Conference on Mechatronics and Automation, Aug. 2011, pp. 75-79.
(Continued)

*Primary Examiner* — Ryan M Gray
(74) *Attorney, Agent, or Firm* — JCIPRNET

(57) ABSTRACT

An ultra-wide head-up display system and a display method thereof are provided. An ultra-wide image displayed by the ultra-wide head up display system is divided into independent head-up display images, an information type of each of the head-up display images is dynamically switched according to a usage status of a vehicle, each of the head-up display images is displayed in a corresponding outer frame, and each of the outer frames is formed by a display region not displaying an image.

27 Claims, 7 Drawing Sheets

(51) Int. Cl.
*G09G 5/14* (2006.01)
*G09G 5/373* (2006.01)
*G06T 19/00* (2011.01)
*G09G 3/00* (2006.01)

(52) U.S. Cl.
CPC ............ *G02B 2027/0123* (2013.01); *G02B 2027/0141* (2013.01); *G02B 2027/0147* (2013.01); *G02B 2027/0181* (2013.01); *G09G 2340/0407* (2013.01); *G09G 2380/10* (2013.01)

(56) References Cited

U.S. PATENT DOCUMENTS

| | | | |
|---|---|---|---|
| 7,903,048 | B2 | 3/2011 | Yanagisawa |
| 8,141,413 | B2 | 3/2012 | Konstandopoulos et al. |
| 8,422,137 | B2 | 4/2013 | Kikuchi et al. |
| 8,681,143 | B2 | 3/2014 | Sugiyama et al. |
| 9,168,869 | B1 | 10/2015 | Kamal |
| 9,817,237 | B2* | 11/2017 | Kutomi .............. G02B 27/0101 |
| 10,242,457 | B1* | 3/2019 | Sibley .................... G09G 3/003 |
| 2008/0218870 | A1 | 9/2008 | Lind et al. |
| 2009/0201589 | A1* | 8/2009 | Freeman ............ G02B 27/0103 359/630 |
| 2011/0187844 | A1* | 8/2011 | Ogawa ..................... B60R 1/00 348/78 |
| 2012/0313850 | A1* | 12/2012 | Ishida ................... G02B 27/01 345/156 |
| 2015/0279321 | A1* | 10/2015 | Falconer ................. G09G 5/10 345/589 |
| 2016/0063761 | A1* | 3/2016 | Sisbot .................... B60W 50/14 345/633 |
| 2016/0070456 | A1 | 3/2016 | Ricci et al. |
| 2016/0170487 | A1* | 6/2016 | Saisho ............... G01C 21/3635 345/156 |
| 2018/0157037 | A1* | 6/2018 | Kasazumi .......... G02B 27/0101 |
| 2019/0025685 | A1* | 1/2019 | Chung ................. H04N 9/3188 |
| 2019/0191131 | A1* | 6/2019 | Uchida .................... G09G 5/38 |
| 2019/0217705 | A1* | 7/2019 | Jun ........................ B60K 35/00 |

FOREIGN PATENT DOCUMENTS

| | | |
|---|---|---|
| CN | 102608760 | 7/2012 |
| CN | 102791510 | 11/2012 |
| CN | 103744258 | 4/2014 |
| CN | 105116546 | 12/2015 |
| CN | 105501123 | 4/2016 |
| CN | 105974583 | 9/2016 |
| CN | 106154704 | 11/2016 |
| CN | 106200224 | 12/2016 |
| CN | 206147178 | 5/2017 |
| JP | 2004168230 | 6/2004 |
| TW | 289801 | 11/1996 |
| TW | 290650 | 11/1996 |
| TW | 201245764 | 11/2012 |
| TW | 201409077 | 3/2014 |
| TW | M515111 | 1/2016 |
| TW | M518190 | 3/2016 |
| TW | 201624101 | 7/2016 |
| TW | M1536362 | 2/2017 |
| TW | 201708881 | 3/2017 |
| TW | M548276 | 9/2017 |

OTHER PUBLICATIONS

Haruhiko Okumura et al., "Hyperrealistic Head-Up-Display for Automotive Application", 2011 IEEE International Conference on Consumer Electronics (ICCE), Mar. 2011, pp. 875-876.

Krittiya Tangmanee et al., "Effects of Guided Arrows on Head-Up Display Towards the Vehicle Windshield", 2012 Southeast Asian Network of Ergonomics Societies Conference (SEANES), Sep. 2012, pp. 1-6.

Shun-Ling Hou et al., "Ultra-Bright Heads-Up Displays Using a Method of Projected Color Images by Combination pf LEDs and Polymer-Dispersed Liquid Crystals", Journal of Display Technology, Mar. 2014, pp. 228-234.

Chao Fan et al., "A Two-Row Interdigitating-Finger Repulsive-Torque Electrostatic Actuator and Its Application to Micromirror Vector Display", Journal of Microelectromechanical Systems, Dec. 2015, pp. 2049-2061.

"Office Action of Taiwan Counterpart Application", dated Jan. 19, 2018, p. 1-p. 9.

"Office Action of Taiwan Related Application, application No. 107116081", dated Mar. 7, 2019, p. 1-p. 13.

"Office Action of China Counterpart Application", dated Aug. 27, 2020, p. 1-p. 17.

\* cited by examiner

ULTRA-WIDE HEAD-UP DISPLAY SYSTEM AND DISPLAY METHOD THEREOF

CROSS-REFERENCE TO RELATED APPLICATION

This application claims the priority benefit of Taiwan application serial no. 106134276, filed on Oct. 3, 2017, and Taiwan application serial no. 107116081, filed on May 11, 2018. The entirety of each of the above-mentioned patent applications is hereby incorporated by reference herein and made a part of this specification.

TECHNICAL FIELD

The disclosure relates to a display apparatus, and particularly relates to an ultra-wide head-up display system and a display method of the ultra-wide head-up display system.

BACKGROUND

Head-up displays (HUD) are a kind of display systems adopted in fighter planes. With the HUDs, pilots are able to view information required for flight missions without lowering their heads. Accordingly, the frequency of the pilots lowering their heads to check the dashboard is lowered, and the interruption of attention and the loss of situation awareness are prevented. Since the HUDs help facilitate safety, relevant technologies are also applied in vehicles, so as to make driving safer and reduce the chance of accidents.

As driving conditions become much more complicated nowadays, a driver needs to pay attention to multiple types of driving information when driving at a high speed. However, single-display HUDs in the known art display one image and are not designed for a flat and elongated area. Therefore, such HUDs do not meet the user's needs. Moreover, a statutorily acceptable display region for vehicle HUDs is mainly an elongated region at the top or the bottom the windscreen panel, while a display ratio of a projector or a display is generally 16:9 or 4:3. Therefore, if the common display ratio is applied to the statutorily acceptable elongated region, only a portion of the region, instead of the whole region, can be utilized for display.

SUMMARY

An ultra-wide head-up display system according to an embodiment of the disclosure is disposed in a vehicle and includes a display apparatus and a control apparatus. The display apparatus includes a head-up display and has a display region for displaying an image. The control apparatus is coupled to the display apparatus and controls the display apparatus to display an ultra-wide image. The ultra-wide image includes at least one head-up display image, the control apparatus dynamically switches an information type displayed by each of the head-up display image based on a usage status of the vehicle, each of the head-up display image is displayed in a corresponding outer frame, and each of the outer frame is formed by the display region not displaying an image.

An ultra-wide head-up display system according to an embodiment of the disclosure is disposed in a vehicle and includes a display apparatus and a control apparatus. The display apparatus includes a head-up display. The control apparatus is coupled to the display apparatus and controls the display apparatus to display an ultra-wide image and an augmented reality image. The ultra-wide image includes at least one head-up display image, the control apparatus dynamically switches an info nation type displayed by each of the head-up display image based on a usage status of the vehicle, each of the head-up display image is displayed in a corresponding outer frame, and each of the outer frame is formed by a display region not displaying an image. The augmented reality image includes at least one head-up display prompt image, the control apparatus adjusts a display position of the head-up display prompt image based on global positioning system information, three-dimensional map information, and a position of an eye of a driver of the vehicle, such that the eye of the driver, the head-up display prompt image, and a prompt target form a straight line.

An embodiment of the disclosure provides a display method of an ultra-wide head-up display system. The ultra-wide head-up display system includes a display apparatus and is disposed in a vehicle. The display apparatus has a display region for displaying an image. The display method includes the following: determining a usage status of the vehicle; and controlling the display apparatus to display an ultra-wide image based on the usage status of the vehicle. The ultra-wide image includes at least one head-up display image, an information type displayed by each of the head-up display image is dynamically switched based on the usage status of the vehicle, each of the head-up display image is displayed in a corresponding outer frame, and each of the outer frame is formed by the display region not displaying an image.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
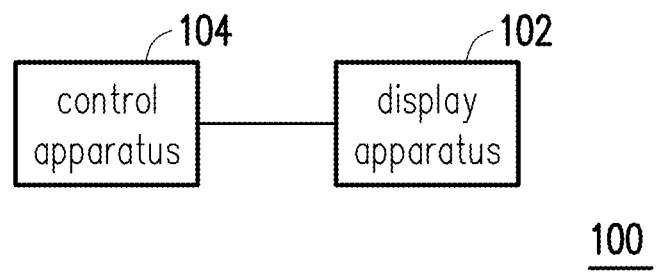
FIG. 1 is a schematic view illustrating an ultra-wide head-up display system according to an embodiment of the disclosure.
Figure 2:
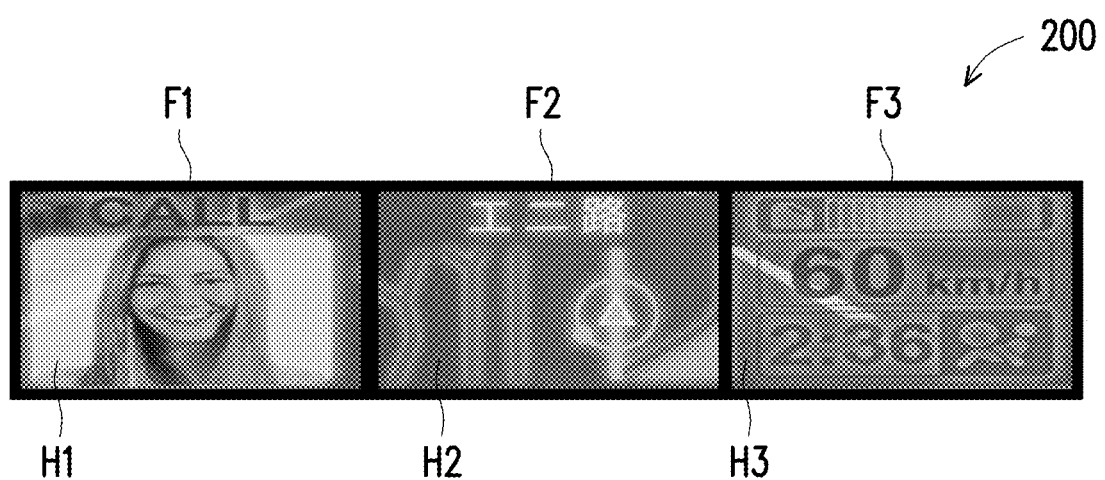
FIG. 2 is a schematic view illustrating an ultra-wide image according to an embodiment of the disclosure.

FIG. 1 is a schematic view illustrating an ultra-wide head-up display system according to an embodiment of the disclosure. Referring to FIG. 1, an ultra-wide head-up display system 100 is suitable to be disposed in a vehicle to display a head-up display image and may include a display apparatus 102 and a control apparatus 104. The display apparatus 102 is coupled to the control apparatus 104. The display apparatus 102 displays an ultra-wide image, and the ultra-wide image may include at least one head-up display image. Each head-up display image is displayed in a corresponding outer frame, and each outer frame is formed by a display region not displaying an image. For example, FIG. 2 is a schematic view illustrating an ultra-wide image according to an embodiment of the disclosure. In the embodiment, an ultra-wide image 200 includes three head-up display images H1, H2, and H3. In addition, the head-up display images H1, H2, and H3 are respectively displayed in outer frames F1, F2, and F3. The head-up display images H1, H2, and H3 respectively display calling information, navigation information, and driving information (e.g., fuel level, speed, time, and/or the like). In other embodiments, the head-up display images H1, H2, and H3 may also respectively display different types of information. The embodiment does not intend to impose a limitation on this regard.

Figure 3:
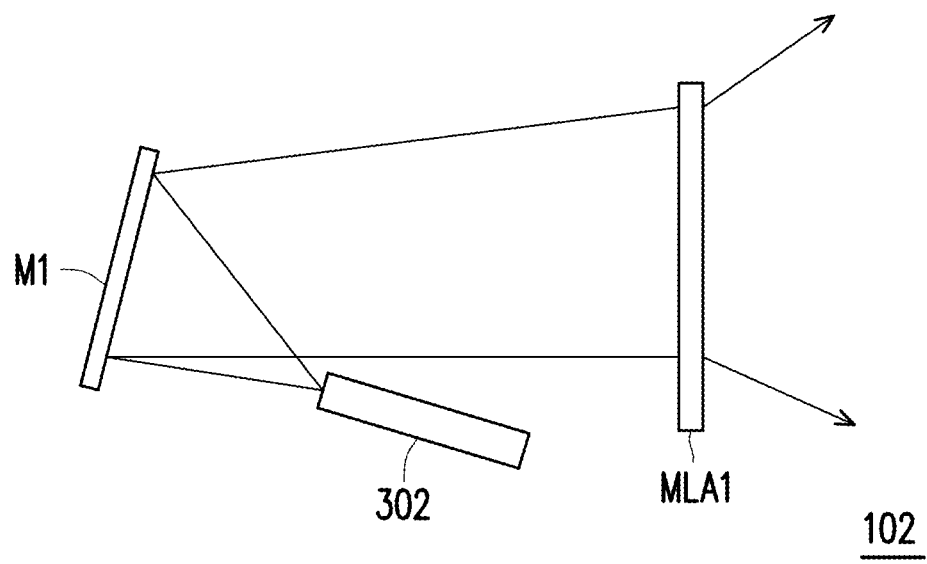
FIG. 3 is a schematic view illustrating a display apparatus according to an embodiment of the disclosure.

A laser pico projector, for example, may be implemented as the display apparatus 102. As shown in the embodiment of FIG. 3, the display apparatus 102 may include an optical engine 302, a reflector M1, and a diffuser MLA1. The optical engine 302 projects an image beam to the reflector M1, and the image beam is guided to the diffuser MLA1 through the reflector M1 and then projected to a screen (e.g., a head-up display screen or a windscreen panel of the vehicle) to be displayed. In some embodiments, the display apparatus 102 may omit the reflector M1 or include more reflectors. In addition, the diffuser MLA1 may also be replaced by an optical micro lens array. If the reflector M1 is omitted and the optical engine 302 directly projects the image beam to the diffuser MLA1, a distance between the optical engine 302 and the diffuser MLA1 needs to be lengthened to achieve a projection image in the same size as that a projection image when the reflector M1 is included, so the size of the display apparatus 102 may be larger. Comparatively, if more reflectors are used, the display apparatus 102 may be miniaturized. The laser pico projector displays the projection image by dotting on the display region. When the laser pico projector projects to regions of the outer frames F1, F2, and F3, the laser pico projector may stop dotting on the display regions, so as to form the outer frames F1, F2, and F3. Namely, the outer frames F1, F2, and F3 may be formed by display regions of the laser pico projector not displaying an image. In other words, images originally at the positions of the outer frames F1, F2, and F3 are not displayed and used as outer frames of the head-up display images H1, H2, and H3.

In other embodiments, the display apparatus 102 is not limited to the laser pico projector. For example, a liquid crystal display, a liquid-crystal-on-silicon (LCOS) display, a digital light processing (DLP) projector, or a micro light emitting diode (micro LED) display may also be implemented as the display apparatus 102. In addition, depending on how the display apparatus 102 is implemented, the ultra-wide image 200 may be formed as a real image or a virtual image, and the outer frames F1, F2, and F3 are formed by the display regions not displaying an image.

Figure 4:
FIG. 4 is a schematic view illustrating a display region of an ultra-wide head-up display system according to an embodiment of the disclosure.

FIG. 4 is a schematic view illustrating a display region of an ultra-wide head-up display system according to an embodiment of the disclosure. Referring to FIG. 4, statutorily acceptable head-up display regions for a vehicle head-up display are as shown in FIG. 4 and may include the head-up display regions H1, H2, and H3, i.e., elongated regions at upper and lower edges of the windscreen panel of the vehicle. The ultra-wide image 200 provided by the ultra-wide head-up display system 100 has a width-to-length ratio greater than or equal to 3 (e.g., 5:1, but the disclosure is not limited thereto). Therefore, the head-up display region H1, H2, or H3 may be properly utilized to make a better use of elongated regions than the known art.

Figure 5:
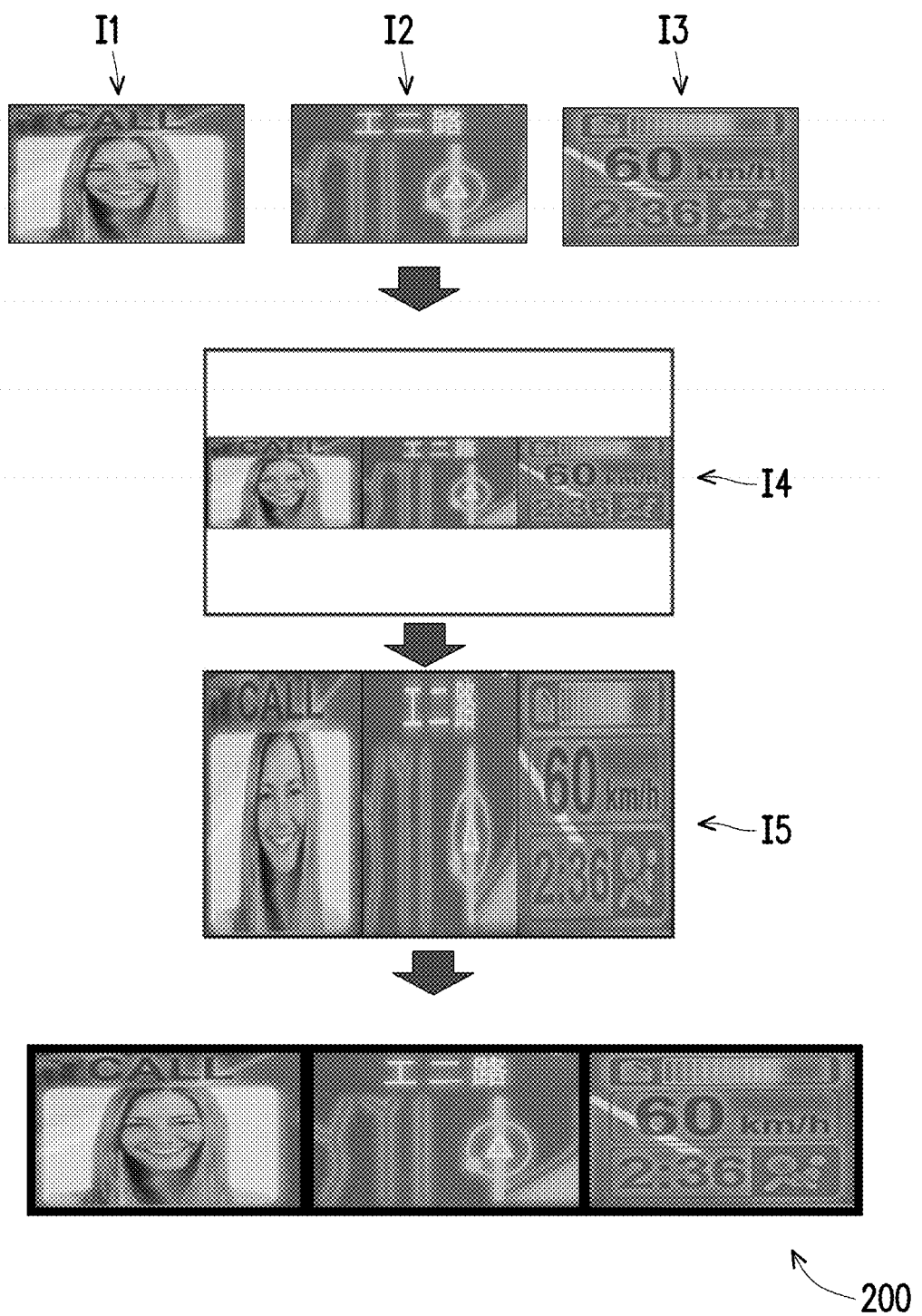
FIG. 5 is a schematic view illustrating an image process on an ultra-wide image according to an embodiment of the disclosure.

FIG. 5 is a schematic view illustrating an image process on an ultra-wide image according to an embodiment of the disclosure. As shown in FIG. 5, the ultra-wide image 200 may be formed by combining a plurality of different images. In the embodiment, the ultra-wide image 200 is formed by three images I1 to I3. However, the disclosure is not limited thereto. An ultra-wide image may also be formed by one image or an arbitrary number of images. The control apparatus 104 may choose at least one image (e.g., choose the three images I1 to I3 in the embodiment) from a plurality of image sources, and combine the at least one chosen image to form a merged image I4. Since aspect ratios of the respective images I1 to I3 are 16:9, an aspect ratio of the merged image I4 formed by combining the images I1 to I3 becomes 48:9 and is unable to be kept at 16:9. In some embodiments, the display apparatus 102 may display the merged image I4 at the ratio of 48:9 without distorting the image. In such case, a portion of the region (e.g., blank regions above and below the merged image I4, which may be displayed in black, for example) of the image displayed by the display apparatus 102 (whose aspect ratio may be, but is not limited to, 16:9, for example) does not contain any image contents. The merged image I4 formed by combining the images I1 to I3 is not limited to being located at the center of the display region of the display apparatus 102 as shown in the embodiment of FIG. 5. The merged image I4 may also be located at an upper part or a lower part of the display region, but the aspect ratio of the merged image I4 remains at 48:9. In the embodiment, the control apparatus 104 may control the display apparatus 102 to display the ultra-wide image (e.g., controlling the laser pico projector to display the ultra-wide image). When the display apparatus 102 displays the ultra-wide image 200, the original image may be distorted (e.g., when the laser pico projector displays the ultra-wide image, the compression of the scan angle in a vertical direction of projection may squeeze the original image along the vertical direction and distort the original image). Hence, the control apparatus 104 of the embodiment may perform an image pre-distorting process on the merged image I4 after the images I1 to I3 are combined to form the merged image I4. For example, by extending the merged image along an extending direction of a short side of the merged image, the pre-torted image may be generated, as shown in FIG. 5. The merged image I4 may be elongated along the vertical direction in advance. In other words, an image pre-distorting process may be performed on the merged image I4 to generate a pre-distorted image I5. Then, the display apparatus 102 may display the ultra-wide image 200 based on the pre-distorted image I5, so as to cancel out the distortion when the display apparatus 102 displays the ultra-wide image 200. Hence, the ultra-wide image 200 without distortion is achieved. In addition, an extent to which the merged image is extended is adjustable based on the number of chosen images to obtain the proportional ultra-wide image without distortion. In addition, the way that the ultra-wide image of the embodiment is displayed reduces the scan angle in the vertical direction of projection of the laser pico projector, and the laser pico projector is prevented from projecting within a range of scan angle with an unstable display quality in order to display an image meeting the aspect ratio of the ultra-wide image 200. The circumstance where the displayed image exhibits image distortion, change of color tone, or split images may be reduced, the display quality of the ultra-wide image is ensured, and the safety is improved.

In addition, even though performing the image pre-distorting process helps prevent image contents of the ultra-wide image 200 from being distorted, a solution available for each image is 426×720 pixels when three images are horizontally combined to form the image, as an original image solution that the pico projector is able to project is fixed (e.g., 1280×720 pixels) when the display apparatus 102 displays the ultra-wide image 200. Even though the aspect ratios of areas of actual projections may still be an aspect ratio of 16:9 or 4:3, the number of pixels in a horizontal direction in such areas may be insufficient, which leaves the concern that the image quality in the horizontal direction may be degraded. Hence, the control apparatus 104 may control the display apparatus 102 to adjust an image solution of the ultra-wide image 200. For example, in the case when the display apparatus 102 is a laser pico projector, since the laser pico projector has a high-speed light dot modulation ability at the GHz level or higher, a dotting density of the laser pico projector in the horizontal direction may be increased through the control apparatus 104 to increase the resolution of the ultra-wide image in the horizontal direction and thereby deal with the degraded resolution in the horizontal direction of individual images (e.g., the images I1 to I3) in the ultra-wide image due to a lower light dot density in the horizontal direction after the respective images in the pre-distorted image I5 are divided in the horizontal direction.

In addition, when the display apparatus 102 is implemented as a liquid crystal display, a liquid-crystal-on-silicon (LCOS) display, a digital light processing (DLP) projector, or a micro light emitting diode (micro LED) display, whose display principles differ from that of the laser pico projector, an ultra-wide image having no distortion and meeting the required aspect ratio (e.g., 5:1) may be obtained by refraining a portion of the display region from displaying. For example, when a liquid crystal display, a liquid-crystal-on-silicon (LCOS) display, a digital light processing (DLP) projector, or a micro light emitting diode (micro LED) display displays the ultra-wide image 200 of FIG. 5, one-third of the display region is adopted to display the ultra-wide image 200, while the remaining two-thirds of the display region do not display any image content. The distortion that occurs when the complete display region is adopted to display the ultra-wide image 200 is avoided. The display region in which no image content is displayed may be located at two long sides of the ultra-wide image 200 (i.e., the upper side and the lower side of the ultra-wide image 200), for example. However, the disclosure is not limited thereto. In some embodiments, the display region in which no image content is displayed may be located at only one of the long sides of the ultra-wide image 200. In addition, the proportion of the display region in which no image content is displayed is not limited to two-thirds of the whole display region, and may be correspondingly varied based on the number of images chosen to form the merged image. For example, if a greater number of images are chosen to form the merged image, the proportion of the display region without displaying any image content is greater.

The image sources may be various sensors or peripheral apparatuses of the vehicle, such as a car camera, an infrared night vision video camera, a navigation apparatus, a rear view camera, a spherical camera, an automotive host system, an apparatus connected to the automotive host system, and the like. In addition, when the automotive host system is connected to a cloud network through a network interface of the system or a mobile phone, the driver may receive various traffic information or information based on the driver's preference and real-time situations, such as recommended stores, sales information, sales activities, and/or the like in a nearby location may be pushed. Even though the calling information, the navigation information, and the driving info illation are adopted as the image contents of the head-up display images H1, H2, and H3 in the above embodiment to describe the ultra-wide head-up display system 100, the control apparatus 104 may also dynamically switch information types displayed in the respective head-up display images based on a usage status of the vehicle. In other words, the images provided by different image sources may be chosen for the image combination and the pre-distorting process based on the usage status of the vehicle, so as to generate the pre-distorted image I5 and display the ultra-wide image 200 based on the pre-distorted image I5. The usage status of the vehicle includes a driving status of the vehicle, a usage status of a system component of the vehicle, and a usage status of a peripheral component of the vehicle.

Figure 6A:
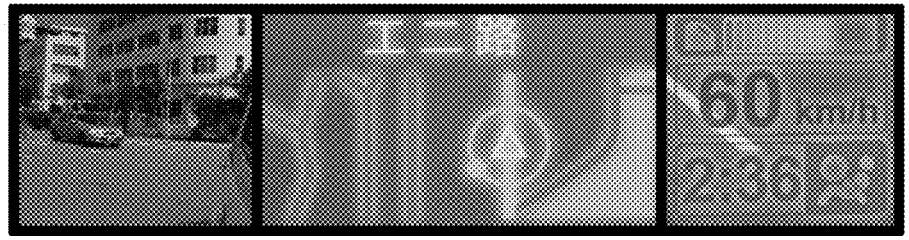
FIGS. 6A to 6D are schematic views illustrating an ultra-wide image according to an embodiment of the disclosure.
Figure 6B:
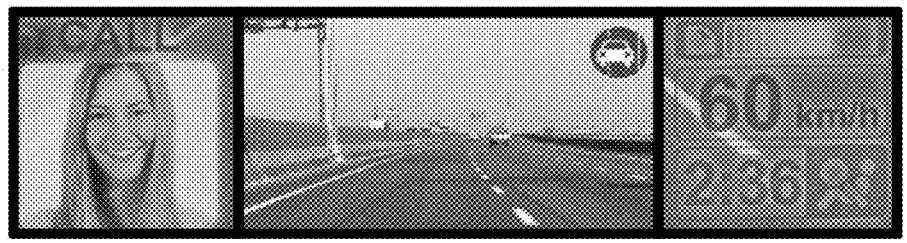

For example, FIGS. 6A to 6D are schematic views illustrating an ultra-wide image according to an embodiment of the disclosure. In FIG. 6A, the control apparatus 104 switches the image contents of the head-up display images in the ultra-wide image based on a turning direction of the vehicle. As shown in FIG. 6A, when the vehicle turns left, the control apparatus 104 may choose image contents captured by a left-side camera (e.g., a camera of the car camera) as the image contents of the head-up display image on the left side in the ultra-wide image to replace the calling information originally displayed in FIG. 2. Similarly, when the vehicle turns right, the control apparatus 104 may also choose image contents captured by a right-side camera as the image contents of the head-up display image on the right side in the ultra-wide image. In some embodiments, the control apparatus 104 may also choose an image provided by a corresponding camera based on a distance sensor of the vehicle, so as to display an object (e.g., a pedestrian or other vehicles) excessively close to the vehicle. As another example, the control apparatus 104 may also choose an image captured by a night vision camera as the image contents of the head-up display image in a scenario with a low ambient brightness (e.g., in the evening, a road without streetlight, or a basement). One further example is that the control apparatus 104 may adopt a speed limit warning sign of the navigation system as the head-up display image on the left side to remind the driver.

Moreover, in some embodiments, based on the usage status of the vehicle, the image contents of the head-up display image in the middle of the ultra-wide image may be replaced by other images. For example, in FIG. 6B, when the vehicle is departed from the lane, the control apparatus 104 may choose image contents captured by the car camera as the image contents of the head-up display image in the middle of the ultra-wide image, so as to replace the navigation information originally displayed in FIG. 2. As an example, when the vehicle is backing, the control apparatus 104 may choose an image provided by the rear view camera to replace the image contents of the head-up display image in the middle.

Figure 6C:
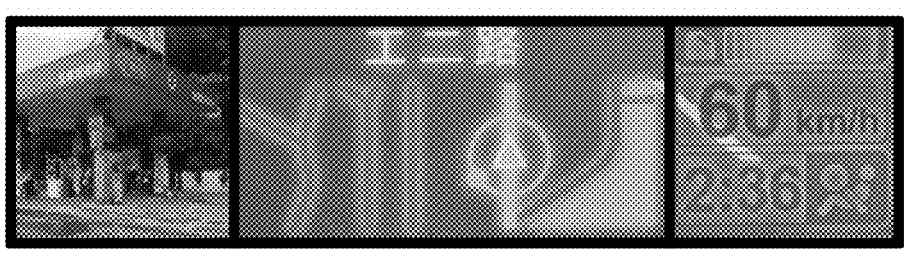
Figure 6D:
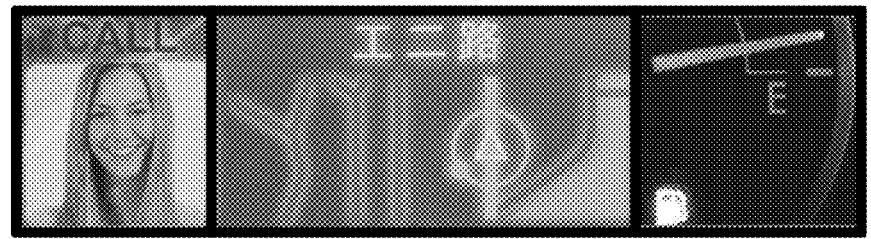

In FIG. 6C, the control apparatus 104 may choose an image of a building nearby (e.g., a picture of a gas station)

as the image contents of the head-up display image on the left side in the ultra-wide image. The image of the building may be stored in a cloud storage apparatus and provided by a mobile apparatus (e.g., a mobile phone) connected with the automotive host system. In other words, the control apparatus 104 may also display the head-up display image based on cloud information. In some embodiments, the cloud information may be weather information, for example.

In addition, the control apparatus 104 may choose vehicle condition information provided by the automotive host system as the image contents of the head-up display image. For example, in FIG. 6D, the control apparatus 104 may display a remaining fuel level of the vehicle in the head-up display image on the right side of the ultra-wide image. However, the disclosure is not limited thereto. In other embodiments, the control apparatus 104 may also adopt tire pressure information or engine anomaly information, for example, as the image contents of the head-up display image.

In addition, while the foregoing embodiments describe the ultra-wide head-up display system with an example where the ultra-wide image includes three head-up display images, the number of the head-up display images included in the ultra-wide image is not limited thereto. In other words, the control apparatus 104 may choose different numbers of images to form the ultra-wide image, and the ultra-wide image may include an arbitrary number of the head-up display images. In addition, the respective head-up display images may be in the same or different sizes/ratios. For example, the head-up display images H1 to H3 of the ultra-wide image 200 shown in the embodiments of FIGS. 2 and 5 have the same size/ratio, while the head-up display image in the middle is larger in the embodiments of FIGS. 6A to 6D. The control apparatus 104 may adjust the sizes and/or the ratios of the respective head-up display images based on the information (e.g., calling information, navigation information, or driving information) corresponding to the respective head-up display images, for example, and may also adjust the sizes and/or the ratios of the respective head-up display images based on a setting signal corresponding to a setting operation by the user, so as to meet the needs of different users. In addition, the control apparatus 104 may also adjust the number of the head-up display images based on the usage status of the vehicle, adjust the number, sizes, and ratios of the outer frames based on the number of the head-up display images included in the ultra-wide image, and correspondingly adjust the resolution of the ultra-wide image, for example. Details concerning the adjustment to the resolution of the ultra-wide image and the pre-distorting process are similar to those in the foregoing embodiment, and thus will not be repeated in the following.

Figure 7:
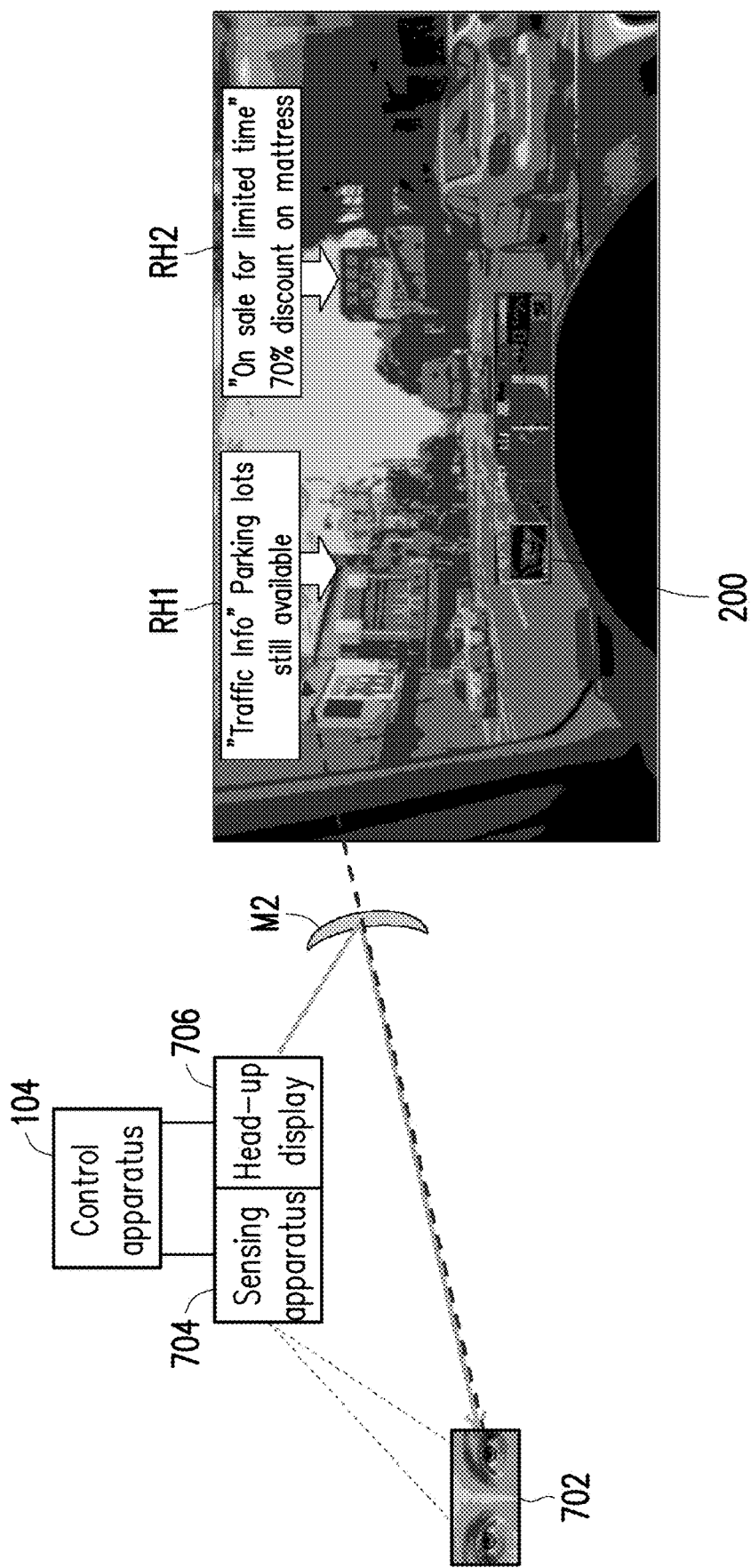
FIG. 7 is a schematic view illustrating that an ultra-wide head-up display system displays an augmented reality image according to an embodiment of the disclosure.

In some embodiments, the ultra-wide head-up display system may further display prompt information, such as nearby recommended stores, sales information, sales activities, parking information, and/or the like on the screen (e.g., on the windscreen panel of the vehicle) in an augmented reality (AR) fashion. FIG. 7 is a schematic view illustrating that an ultra-wide head-up display system displays an augmented reality image according to an embodiment of the disclosure. As shown in FIG. 7, in the embodiment, the ultra-wide head-up display system may further include a sensing apparatus 704 coupled to the control apparatus 104. The sensing apparatus 704 may sense an eye position of the driver of the vehicle, and a video camera, for example, may be implemented as the sensing apparatus 704. In the embodiment, the display apparatus 102 may include a head-up display 706 and a concave mirror M2. The head-up display 706 may guide an image beam provided by the head-up display 706 to the driver's eye 702 through the concave mirror M2. In such case, a distance between the concave mirror M2 and the diffuser MLA1 in the head-up display needs to be within a designed focal distance of the concave mirror M2. Based on optical principles of virtual image formation, the driver is able to view a virtual image floating in the air outside the windscreen panel, i.e., an AR display image.

By adjusting a relative angle between the head-up display 706 and the concave mirror M2, an angle at which the image beam is projected to the driver's eye 702, i.e., an orientation (angle) of the AR image outside the windscreen panel of the vehicle perceived by a human eye, may be adjusted. A relation (distance) between positions of the human eye and the perceived AR image is determined by a relative distance between the diffuser MLA1 in the head-up display 706 and the concave mirror M2. In principle, the location of the virtual image is determined based on a lens imaging principle. For example, when the diffuser MLA1 is disposed at a focal point of the concave mirror M2, the virtual image is formed at infinity (i.e., unable to form the image), and when the diffuser MLA1 of FIG. 3 is disposed between the focal point of the concave mirror M2 and the concave mirror M2, as the diffuser MLA1 gets closer to the concave mirror M2, an imaging position of the virtual image also gets closer to the concave mirror M2, and the size of the virtual image becomes smaller. In other embodiments, an optical lens for forming the virtual image is not limited to the concave mirror, and may also be a convex mirror or a flat mirror, for example. Since the principles of forming a virtual image by adopting a convex mirror and a flat mirror are already well-known (e.g., the principle of forming a virtual image by adopting a convex mirror is to dispose an object at a location within a focal point of the convex mirror, and the principle of forming a virtual image by adopting a flat mirror is to keep a ratio of a distance from the imaging position of the virtual image to the flat mirror and a distance between the object and the flat mirror at 1:1), people of ordinary skill in the art should be familiar with how a virtual image is formed by adopting a convex mirror or a flat mirror. Thus, details in this regard will not be repeated in the following.

The AR image in the embodiment includes head-up display prompt images RH1 and RH2. In some embodiments, the control apparatus 104 may also adjust a position of the lens by controlling an electronically controlled adjustment mechanism (not shown), so as to modify a light path of the image beam. In other words, the modification is not limited to adjusting the projection angle of beam of the head-up display 706. The control apparatus 104 may adjust the image beam to project the image beam to the driver's eye 702 by, for example, adjusting display positions of the head-up display prompt images RH1 and RH2 based on global positioning system information, three-dimensional map information, and the position of the driver's eye 702. Accordingly, the driver's eye 702, the head-up display prompt image, and a prompt target may form a straight line. Hence, the head-up display images RH1 and RH2 are able to be displayed at or beside locations of the prompt targets to accurately provide prompt information regarding the prompt targets.

For example, in FIG. 7, the head-up display prompt image RH1 may display traffic information about parking. Based on the GPS information and the three-dimensional map information, the control apparatus 104 may determine whether a distance between the vehicle and a parking tower nearby is shorter than a predetermined distance. When the distance between the vehicle and the parking tower nearby is shorter than the predetermined distance, the control apparatus 104 may control the head-up display 706 to project a head-up display prompt image about parking information. Under the circumstance, the control apparatus 104 may obtain the distance between the parking tower and the vehicle or coordinate positions of the parking tower and the vehicle and a height of the parking tower based on the GPS information and the three-dimensional map information. In addition, through the sensing apparatus 704, the control apparatus 104 may obtain the position of the user's eye 702. Based on the information, the control apparatus 104 may adjust the light path of the projection beam of the head-up display 706 (e.g., calculating a trigonometric relation among the user's eye 702, the head-up display prompt image RH1, and a top of the parking tower through a trigonometric function to adjust the light path of the projection beam of the head-up display 706). Accordingly, the user's eye, the head-up display prompt image RH1 on the windscreen panel of the vehicle, and the parking tower form a straight line. In this way, the head-up display prompt image RH1 may accurately label the top of the parking tower, and the position of the head-up display prompt image RH1 may not be deviated, which may lead the driver to misconceive the information provided by the head-up display prompt image RH1, due to a change of a driver's viewing position, a change of the distance between the vehicle and the parking tower, or an inaccessibility of the height of the parking tower. Accordingly, the driver may perceive prompt information in an intuitive and convenient way through AR display.

Similarly, the display position of the head-up display prompt image RH2 may also be adjusted in a way similar to the adjustment to the display position of the head-up display prompt image RH1. Hence, details in this regard will not be repeated in the following. It should be noted that contents displayed in the head-up display prompt images RH1 and RH2 are not limited to the embodiment of FIG. 7, and the contents displayed may differ as a search setting of the user differs or the information provided by the three-dimensional map information differs. For example, pushed information such as surrounding, traffic, navigation, warning information, and/or the like may serve as the contents displayed by the head-up display prompt image. In some embodiments, the head-up display image may be displayed in a flicking manner to draw the driver's attention.

Figure 8:
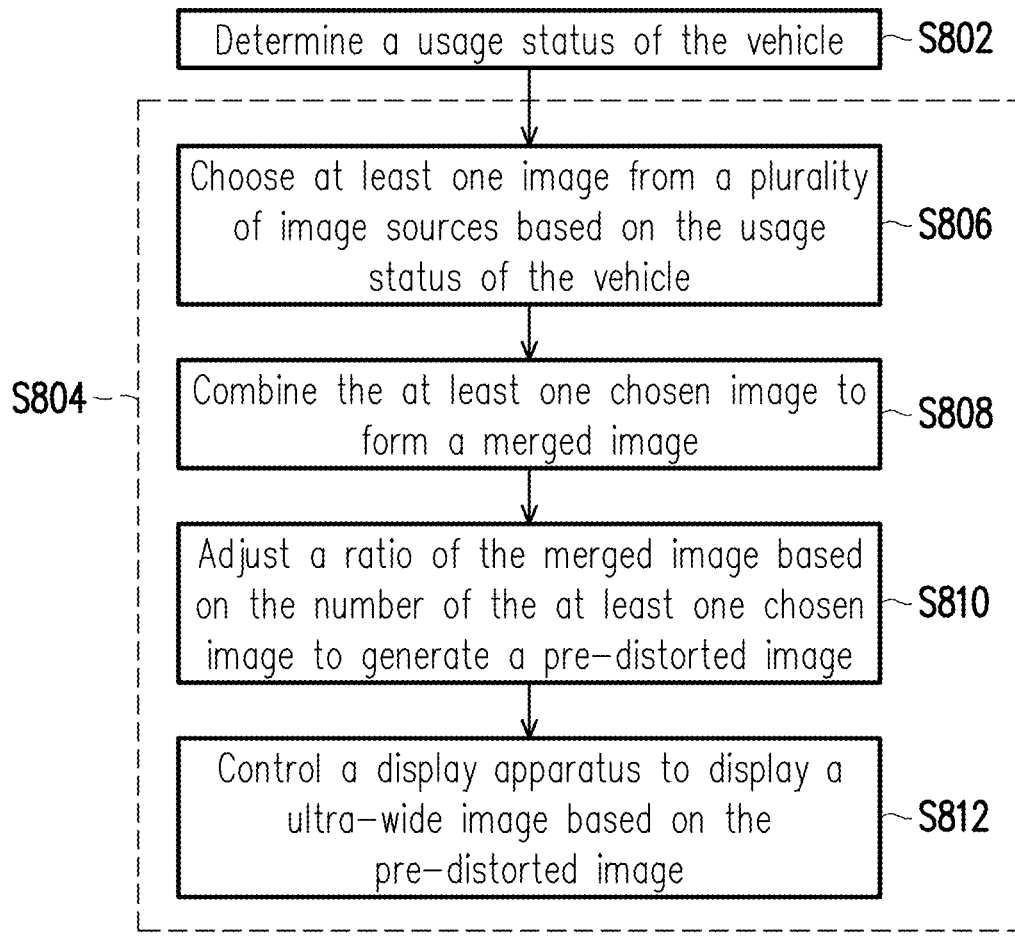
FIG. 8 is a schematic view illustrating a display method of an ultra-wide head-up display system according to an embodiment of the disclosure.

FIG. 8 is a schematic view illustrating a display method of an ultra-wide head-up display system according to an embodiment of the disclosure. Referring to FIG. 8, the display method of the ultra-wide head-up display system may at least include steps as follows. First of all, a usage state of a vehicle is determined (Step S802). The usage state of the vehicle may include, for example, a driving status of the vehicle, a usage status of a system component of the vehicle, and a usage status of a peripheral component of the vehicle. Then, based on the usage status of the vehicle, a display apparatus is controlled to display an ultra-wide image. A width-to-length ratio of the ultra-wide image is greater than or equal to 3, the ultra-wide image includes at least one head-up display image, and an information type displayed by each head-up display image is dynamically switched based on the usage status of a vehicle. Each head-up display image is displayed in a corresponding outer frame, and each outer frame is formed by a display region not displaying an image (Step S804). The display apparatus may be a laser pico projector, a liquid crystal display, a liquid-crystal-on-silicon (LCOS) display, a digital light processing (DLP) projector, or a micro light emitting diode (micro LED) display. In addition, the laser pico projector may project the ultra-wide image through at least one reflector or directly project the ultra-wide image without a reflector. Step S804 may include choosing at least one image from a plurality of image sources based on the usage status of the vehicle (Step S806). The image sources may be, for example, various sensors or peripheral apparatuses of the vehicle, such as a car camera, an infrared video camera, a navigation apparatus, a rear view camera, an automotive host system, an apparatus connected to the automotive host system, and the like. Then, the images chosen are combined to form a merged image (Step S808). In some embodiments, the number, the size, and the ratio of the at least one outer frame are adjusted based on the usage status of the vehicle, and the information type displayed by each head-up display image is determined based on the usage status of the vehicle. Then, based on the number of chosen images, the ratio in the merged image is adjusted to generate a pre-distorted image (Step S810), such as extending the merged image along an extending direction of a short side of the merged image to reduce an aspect ratio of the merged image and generate the pre-distorted image. Then, the display apparatus is controlled to display the ultra-wide image based on the pre-distorted image (Step S812). In some embodiments, Step S810 may include adjusting an image resolution of the ultra-wide image based on the number of chosen images. For example, a dotting density of the laser pico projector in a horizontal direction may be increased to increase a resolution of the ultra-wide image in the horizontal direction. A degraded resolution in a horizontal direction of an individual image in the ultra-wide image due to a lower light dot density in the horizontal direction after the respective images in the pre-distorted image are divided in the horizontal direction. Moreover, in some embodiment, the merged image generated at Step S808 may be directly displayed without the image pre-distorting process. In such case, image contents displayed by the display apparatus include the merged image and a display image without image content. For example, when the display apparatus is implemented as a liquid crystal display, a liquid-crystal-on-silicon (LCOS) display, a digital light processing (DLP) projector, or a micro light emitting diode (micro LED) display, one-third of the display region is adopted to display the ultra-wide image, while the remaining two-thirds of the display region do not display any image content. The distortion that occurs when the complete display region is adopted to display the ultra-wide image is avoided. The display region in which no image content is displayed may be located at two long sides of the ultra-wide image (i.e., the upper side and the lower side of the ultra-wide image). In addition, the proportion of the display region in which no image content is displayed is not limited to two-thirds of the whole display region. For example, if a greater number of images are chosen to form the merged image, the proportion taken up by the display region without displaying any image content is greater.

The ultra-wide head-up display system according to the embodiments of the disclosure may display the ultra-wide image. The ultra-wide image may be divided into a plurality of independent head-up display images and be displayed at the ideal aspect ratio. In addition, the information type displayed by each head-up display images may be dynamically switched based on the usage status of the vehicle. The statutorily acceptable display region may be used properly, and the information required by the driver may be provided intuitively. Hence, the driving safety is facilitated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An ultra-wide head-up display system, disposed in a vehicle and comprising:

a display apparatus, comprising a head-up display having a display region for displaying an image; and a control apparatus, coupled to the display apparatus and controlling the display apparatus to display an ultra-wide image, wherein the ultra-wide image comprises at least one head-up display image, the control apparatus dynamically switches an information type displayed by each of the at least one head-up display image based on a usage status of the vehicle, each of the at least one head-up display image is displayed in a corresponding outer frame, each of the outer frame is formed by the display region not displaying an image, and a part of the image is replaced by the outer frame, wherein the control apparatus adjusts the number, a size, and a ratio of the at least one outer frame based on the usage status of the vehicle, and determines the information type displayed by each of the at least one head-up display image based on the usage status of the vehicle, wherein the control apparatus chooses at least one image from a plurality of image sources based on the usage status of the vehicle, combines the at least one chosen image to form a merged image, the control apparatus further extends the merged image along an extending direction of a short side of the merged image according to the number of the at least one chosen image, so as to reduce an aspect ratio of the merged image and generate a pre-distorted image, and the control apparatus controls the display apparatus to display the ultra-wide image based on the pre-distorted image, wherein each chosen image has a first aspect ratio, the merged image and the ultra-wide image have a second aspect ratio, and the second aspect ratio is larger than the first aspect ratio.

2. The ultra-wide head-up display system as claimed in claim 1, wherein the display apparatus further comprises an optical lens guiding an image beam provided by the head-up display to a driver's eye to form a virtual image.

3. The ultra-wide head-up display system as claimed in claim 2, wherein the optical lens comprises a concave mirror, a convex mirror, or a flat mirror.

4. The ultra-wide head-up display system as claimed in claim 1, wherein the usage status of the vehicle comprises a driving status of the vehicle, a usage status of a system component of the vehicle, and a usage status of a peripheral component of the vehicle.

5. The ultra-wide head-up display system as claimed in claim 1, wherein the control apparatus further adjusts an image resolution of the ultra-wide image based on the number of the at least one chosen image.

6. The ultra-wide head-up display system as claimed in claim 5, wherein the display apparatus comprises a laser pico projector, the control apparatus further controls the laser pico projector to increase dotting density of projection of the laser pico projector in a horizontal direction, so as to increase the image resolution of the ultra-wide image in the horizontal direction and maintain a resolution of each of the at least one chosen image in the ultra-wide image.

7. The ultra-wide head-up display system as claimed in claim 1, wherein a width-to-length ratio of the ultra-wide image is greater than or equal to 3.

8. The ultra-wide head-up display system as claimed in claim 1, wherein the display apparatus comprises a liquid-crystal-on-silicon (LCOS) display, a digital light processing (DLP) projector, or a micro light emitting diode (micro LED) display, and a portion of the display region of the display apparatus displays the ultra-wide image.

9. The ultra-wide head-up display system as claimed in claim 8, wherein the ultra-wide image takes up one-third of the display region.

10. The ultra-wide head-up display system as claimed in claim 8, wherein the display region comprises a first region and a second region without image content, and the first region and the second region are respectively located at a first long side and a second long side of the ultra-wide image.

11. The ultra-wide head-up display system as claimed in claim 1, wherein the display apparatus comprises a laser pico projector and at least one reflector, and the laser pico projector projects the ultra-wide image through the at least one reflector.

12. A display method of an ultra-wide head-up display system, wherein the ultra-wide head-up display system comprises a display apparatus and is disposed in a vehicle, the display apparatus has a display region for displaying an image, and the display method comprises:

determining a usage status of the vehicle;

controlling the display apparatus to display an ultra-wide image based on the usage status of the vehicle, wherein the ultra-wide image comprises at least one head-up display image, an information type displayed by each of the at least one head-up display image is dynamically switched based on the usage status of the vehicle, each of the at least one head-up display image is displayed in a corresponding outer frame, each of the outer frame is formed by the display region not displaying an image, and a part of the image is replaced by the outer frame;

adjusting the number, a size, and a ratio of the at least one outer frame based on the usage status of the vehicle, and determining the information type displayed by each of the at least one head-up display image based on the usage status of the vehicle; and choosing at least one image from a plurality of image sources based on the usage status of the vehicle, combining the at least one chosen image to form a merged image, extending the merged image along an extending direction of a short side of the merged image according to the number of the at least one chosen image, so as to reduce an aspect ratio of the merged image and generate a pre-distorted image, and controlling the display apparatus to display the ultra-wide image based on the pre-distorted image, wherein each chosen image has a first aspect ratio, the merged image and the ultra-wide image have a second aspect ratio, and the second aspect ratio is larger than the first aspect ratio.

13. The display method as claimed in claim 12, wherein the usage status of the vehicle comprises a driving status of the vehicle, a usage status of a system component of the vehicle, and a usage status of a peripheral component of the vehicle.

14. The display method as claimed in claim 12, further comprising:
    choosing at least one image from a plurality of image sources based on the usage status of the vehicle;
    combining the at least one chosen image to form a merged image; and
    displaying the merged image.

15. The display method as claimed in claim 14, wherein image contents displayed by the display apparatus comprise the merged image and a display image without image content.

16. The display method as claimed in claim 14, further comprising:
    adjusting a ratio of the merged image based on the number of the at least one chosen image to generate a pre-distorted image; and
    controlling the display apparatus to display the ultra-wide image based on the pre-distorted image.

17. The display method as claimed in claim 16, further comprising:
    extending the merged image along an extending direction of a short side of the merged image according to the number of the at least one chosen image, so as to reduce an aspect ratio of the merged image and generate the pre-distorted image.

18. The display method as claimed in claim 16, further comprising:
    adjusting an image resolution of the ultra-wide image based on the number of the at least one chosen image.

19. The display method as claimed in claim 18, wherein the display apparatus comprises a laser pico projector, and the display method further comprises:
    controlling the laser pico projector to increase dotting density of projection of the laser pico projector in a horizontal direction, so as to increase the resolution of the ultra-wide image in the horizontal direction and maintain a resolution of each of the at least one chosen image in the ultra-wide image.

20. The display method as claimed in claim 12, wherein a width-to-length ratio of the ultra-wide image is greater than or equal to 3.

21. The display method as claimed in claim 12, wherein the display apparatus comprises a liquid-crystal-on-silicon (LCOS) display, a digital light processing (DLP) projector, or a micro light emitting diode (micro LED) display, and a portion of the display region of the display apparatus displays the ultra-wide image.

22. The display method as claimed in claim 21, wherein the ultra-side image takes up one-third of the display region.

23. The display method as claimed in claim 21, wherein the display region comprises a first region and a second region without image content, and the first region and the second region are respectively located at a first long side and a second long side of the ultra-wide image.

24. The display method as claimed in claim 12, wherein the display apparatus comprises a laser pico projector, and the laser pico projector projects the ultra-wide image through at least one reflector.

25. An ultra-wide head-up display system, disposed in a vehicle and comprising:
    a display apparatus, comprising a head-up display; and
    a control apparatus, coupled to the display apparatus and controlling the display apparatus to display an ultra-wide image and an augmented reality image, wherein the control apparatus dynamically switches an information type displayed by each of the at least one display head-up display image, each of the at least one display head-up display image is displayed in a corresponding outer frame, each of the outer frame is formed by a display region not displaying an image, the augmented reality image comprises at least one head-up display prompt image, the control apparatus adjusts a display position of the head-up display prompt image based on calculating a relationship among the driver's eye, the head-up display prompt image, global positioning system information, three-dimensional map information, and a position of an eye of a driver of the vehicle, such that the eye of the driver, the head-up display prompt image, and a prompt target form a straight line, and the prompt target is an object outside the vehicle, and the head-up display prompt image is placed on the head-up display to direct user's eyes to a search target which comprises the prompt target.

26. The ultra-wide head-up display system as claimed in claim 25, wherein the display apparatus further comprises an optical lens guiding an image beam provided by the head-up display to the eye of the driver to form a virtual image.

27. The ultra-wide head-up display system as claimed in claim 26, wherein the optical lens comprises a concave mirror, a convex mirror, or a flat mirror.

* * * * *